(12) United States Patent
Shin

(10) Patent No.: US 9,104,243 B2
(45) Date of Patent: Aug. 11, 2015

(54) VEHICLE OPERATION DEVICE

(71) Applicant: HYUNDAI MOTOR COMPANY, Seoul (KR)

(72) Inventor: Dongsoo Shin, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/144,436

(22) Filed: Dec. 30, 2013

(65) Prior Publication Data

US 2015/0088336 A1 Mar. 26, 2015

(30) Foreign Application Priority Data

Sep. 25, 2013 (KR) .................. 10-2013-0114057

(51) Int. Cl.
*G05D 1/00* (2006.01)
*G06F 3/01* (2006.01)
*H04L 9/32* (2006.01)

(52) U.S. Cl.
CPC ...... *G06F 3/017* (2013.01); *H04L 9/32* (2013.01); *H04L 9/3244* (2013.01)

(58) Field of Classification Search
CPC ..... H04L 9/32; H04L 9/3244; H04L 63/0869; G06F 3/0489; G06F 3/017; G06F 1/1694; G06F 3/011
USPC ............. 701/1, 36, 30.3, 30.9, 31.7; 713/170, 713/168
See application file for complete search history.

(56) References Cited

U.S. PATENT DOCUMENTS 8,121,808 B2 * 2/2012 Huang et al. .................. 702/141

FOREIGN PATENT DOCUMENTS

| JP | 2012-018622 A | 1/2012 |
| KR | 10-2003-0009918 A | 2/2003 |
| KR | 10-1267378 | 11/2010 |
| KR | 10-20120048190 A | 5/2012 |
| KR | 10-2012-0057444 A | 6/2012 |
| KR | 1020120057444 | * 6/2012 |

* cited by examiner

*Primary Examiner* — Gertrude Arthur Jeanglaud
(74) *Attorney, Agent, or Firm* — McDermott Will & Emery LLP

(57) ABSTRACT

A vehicle operation device is provided, including: a gesture sensor configured to sense a user's hand to generate image information, and a gesture recognizer configured to recognize a gesture by using the image information and generate feature information of the recognized gesture. A controller is configured to generate vehicle state information by sensing a vehicle state and perform a control operation corresponding to the feature information, in which the gesture recognizer determines whether the gesture or the vehicle state correspond to a gesture cancellation condition by using the image information and the vehicle state information and initializes a recognition operation of the gesture when the gesture or the vehicle state corresponds to the gesture cancellation condition.

10 Claims, 2 Drawing Sheets

VEHICLE OPERATION DEVICE

CROSS-REFERENCE TO RELATED APPLICATION

This application claims priority to and the benefit of Korean Patent Application No. 10-2013-0114057 filed in the Korean Intellectual Property Office on Sep. 25, 2013, the entire contents of which are incorporated herein by reference.

TECHNICAL FIELD

The present disclosure relates to a vehicle operation device, and particularly, to a vehicle operation device capable of operating a vehicle by recognizing a user's gesture.

BACKGROUND

Generally, a vehicle information device is a device to provide assistance for driving of a vehicle or convenience and entertainment of a passenger. For example, the vehicle information device includes audio, an audio visual navigation (AVN) system, a telematics, and the like.

Recently, some of the vehicle information devices are controlled by a remote control method in order to prevent a driver's eyes from deviating from the road while driving to operate buttons of the information devices.

As the remote control method, there are methods for controlling a vehicle information device by using a button disposed on a handle of a vehicle, recognizing a user's gesture, and the like. Among these, the method for recognizing a user's gesture may be a method of photographing a user's hand by a camera and using a motion of the user's hand as an intuitive button by analyzing the photographed image.

The above information disclosed in this Background section is only for enhancement of understanding of the background of the disclosure and therefore it may contain information that does not form the prior art that is already known in this country to a person of ordinary skill in the art.

SUMMARY

In order to use the motion of the user's hand as the intuitive button, it is important to accurately recognize a user's intention when making a gesture. The reason is that when the information devices are abruptly operated by recognizing the gestures which were not intended to operate the vehicle during the driving of the vehicle, user's attention is diverted, and thus, an accident may occur.

For example, the gestures may be misrecognized under situations such as an operation of moving the user's hand in order for the user to press the buttons which are disposed on the handle, a meaningless operation, and a cancellation operation during an input of the gestures, or the like. In particular, unlike a laboratory or a home, since various operations may be simultaneously performed in the vehicle, there is a need to accurately recognize the gestures.

The present disclosure has been made in an effort to provide a vehicle operation device capable of preventing gestures which are unrelated with a user's intention from being misrecognized.

An exemplary embodiment of the present disclosure provides a vehicle operation device, including: a gesture sensor is configured to sense a user's hand to generate image information, and a gesture recognizer configured to recognize a gesture by using the image information and generate feature information of the recognized gesture. A controller configured to generate vehicle state information by sensing a vehicle state and perform a control operation corresponding to the feature information, in which the gesture recognizer determines whether the gesture or the vehicle state correspond to a gesture cancellation condition by using the image information and the vehicle state information and initializes a recognition operation of the gesture when the gesture or the vehicle state corresponds to the gesture cancellation condition.

The gesture sensor may include at least one of a camera capturing an image of the user's hand and a sensor sensing a motion of the hand. The gesture recognizer may detect the hand from the image information and track a motion of the detected hand to recognize the gesture.

The gesture recognizer may track the motion of the hand depending on whether a pattern of the detected hand satisfies a detection condition. The detection condition may include a gesture input pattern which activates a gesture input mode.

The gesture recognizer may generate a trajectory corresponding to the motion of the hand and recognize the gesture depending on whether the trajectory of the hand satisfies a gesture recognition condition. The gesture recognition condition may include at least any one of a state in which the motion of the hand stops, a state in which the motion of the hand passes a predetermined period of time or more, and a state in which the gesture is input as an input completion pattern which inactivates the gesture input mode.

The gesture cancellation condition may be at least any one of a situation in which the input of the gesture stops, a situation in which the gesture is input as an input cancellation pattern, a situation in which an operation of a physical button disposed in a vehicle is sensed, and a situation in which a driving environment of the vehicle is changed.

The gesture recognizer may initialize a recognition operation of the gesture when the feature information is generated. The gesture recognizer may detect a specific hand pause of the user and recognize the gesture with the detected hand pause.

According to the exemplary embodiments of the present disclosure, only when the user intentionally inputs the gestures, the gesture is recognized, and the process of recognizing the gesture is forcibly initialized by determining the non-intentional gesture As a result, it is possible to prevent the phenomenon that the operation device is operated by the operation of moving the user's hand in order for the user to press the button, or perform meaningless operations.

Further, according to the exemplary embodiments of the present disclosure, the gesture recognition process is activated by accurately detecting the operation of starting and ending the input of the gesture and the feature information is extracted, thereby preventing the phenomenon that the gesture is misrecognized.

DETAILED DESCRIPTION

Figure 1:
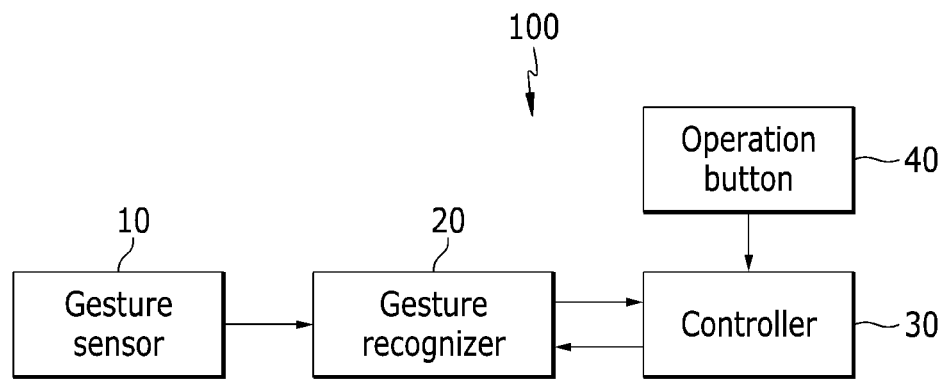
FIG. 1 is a block diagram illustrating a vehicle operation device according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, exemplary embodiments which may be readily practiced by those skilled in the art to which the present invention pertains will be described in detail with reference to the accompanying drawings.

FIG. 1 is a block diagram illustrating a vehicle operation device according to an exemplary embodiment of the present disclosure.

Referring to FIG. 1, a vehicle operation device 100 according to the exemplary embodiment of the present disclosure includes a gesture sensor 10, a gesture recognizer 20, a controller 30, and an operation button 40. The gesture sensor 10 senses a user's hand and photographs a motion of the sensed user's hand to generate image information. The gesture sensor 10 may include a 3D camera or an infrared camera, which photographs the user's hand; a motion sensor, which senses the motion of the user's hand; or the like. Here, the camera or the motion sensor may be installed in the vicinity of the user, for example, at a portion of the vehicle in front of a driving seat.

The gesture recognizer 20 receives the image information from the gesture sensor 10 and receives vehicle state information from the controller 30. The gesture recognizer 20 recognizes a user's gesture by using the image information, generates feature information of the recognized gesture, and then transfers the generated feature information to the controller 30.

Further, the gesture recognizer 20 determines whether a motion of a hand or a state of a vehicle satisfies a gesture cancellation condition by using the image information and the vehicle state information and initializes a gesture recognition operation when the motion of the hand or the state of the vehicle satisfies the gesture cancellation condition. Further, the gesture recognizer 20 may initialize the gesture recognition operation even when the featured information of the corresponding gesture is generated.

Herein, the gesture cancellation condition may include conditions, such as when the input of the gesture stops in a gesture input activation mode, the recognized gesture corresponds to an input cancellation pattern, an operation of a physical button is sensed, and a driving environment of a vehicle is changed.

For example, the operation of the physical button may include an operation of pressing buttons, such as AVN, an interior light (map light), a safety belt, and a navigation system; and an operation of touching other operation devices including a touch sensor, or the like. Further, the operation of the physical button may include operations, such as operating a gear knob to change a gear, operating a window, and using a telephone. Herein, it is possible to sense whether the user operation is performed by mounting the touch sensor in the gear knob.

The driving environment of the vehicle may include a vehicle acceleration, deceleration, rotation beyond a predetermined value, vibration, and impact. Further, the driving environment of the vehicle may include environments in which a vehicle passes through a specific position previously input in the navigation system, or excessive braking or accelerating.

In detail, the gesture recognizer 20 detects the user's hand from the image information and activates a gesture input mode depending on a pattern of the detected hand. In the gesture input mode, the gesture recognizer 20 tracks the motion of the hand to generate a trajectory and recognizes the gesture depending on the generated trajectory of the hand.

Herein, the gesture recognizer 20 may activate the gesture input mode when the pattern of the hand corresponds to a predetermined gesture input pattern. Further, the gesture recognizer 20 generates the feature information of the recognized gesture when the motion of the hand satisfies the conditions required to recognize the gesture while the motion of the hand is tracked. Herein, the gesture recognition condition may include conditions, such as the motion of the hand stops or passes a predetermined period of time or more, and the gesture corresponds to an input completion pattern which inactivates the gesture input mode.

The exemplary embodiment of the present disclosure is not limited thereto and the gesture recognizer 20 may detect a specific hand pause of the user from the image information and recognize the gesture with the detected hand pause. That is, the process in which the gesture recognizer 20 tracks the motion of the hand by activating the gesture input mode may be omitted. Herein, the gesture recognizer 20 may continuously detect the hand pause of the user and generate the trajectory with a position of the detected hand to recognize the gesture.

Further, the gesture recognizer 20 may communicate with the controller 30 and a control area network (CAN) to receive the vehicle state information. The exemplary embodiment of the present disclosure is not limited thereto, and the gesture recognizer 20 may directly receive the operation information from the operation button 40.

The controller 30 receives the featured information from the gesture recognizer 20 and extracts an execution function corresponding to the feature information to perform the control operation of the information devices. For example, the controller 30 may extract an execution function of turning up a volume of an audio, reducing a temperature of an air conditioner, and the like.

Further, the controller 30 senses the vehicle state to generate the vehicle state information. Herein, the controller 30 may sense speed, lateral acceleration, and rotating angular velocity of a vehicle, whether the buttons are operated, and the like, by using a plurality of sensors, and the like, in the vehicle.

The operation button 40 includes a plurality of physical buttons which are installed in the vehicle. The operation button 40 may include the physical buttons disposed on a handle, touch buttons included in the navigation system, and the like, shift buttons installed in the gear knob, and the like. The operation button 40 may transfer activation information of the button, which is selected from the plurality of physical buttons, to the controller 30.

Figure 2:
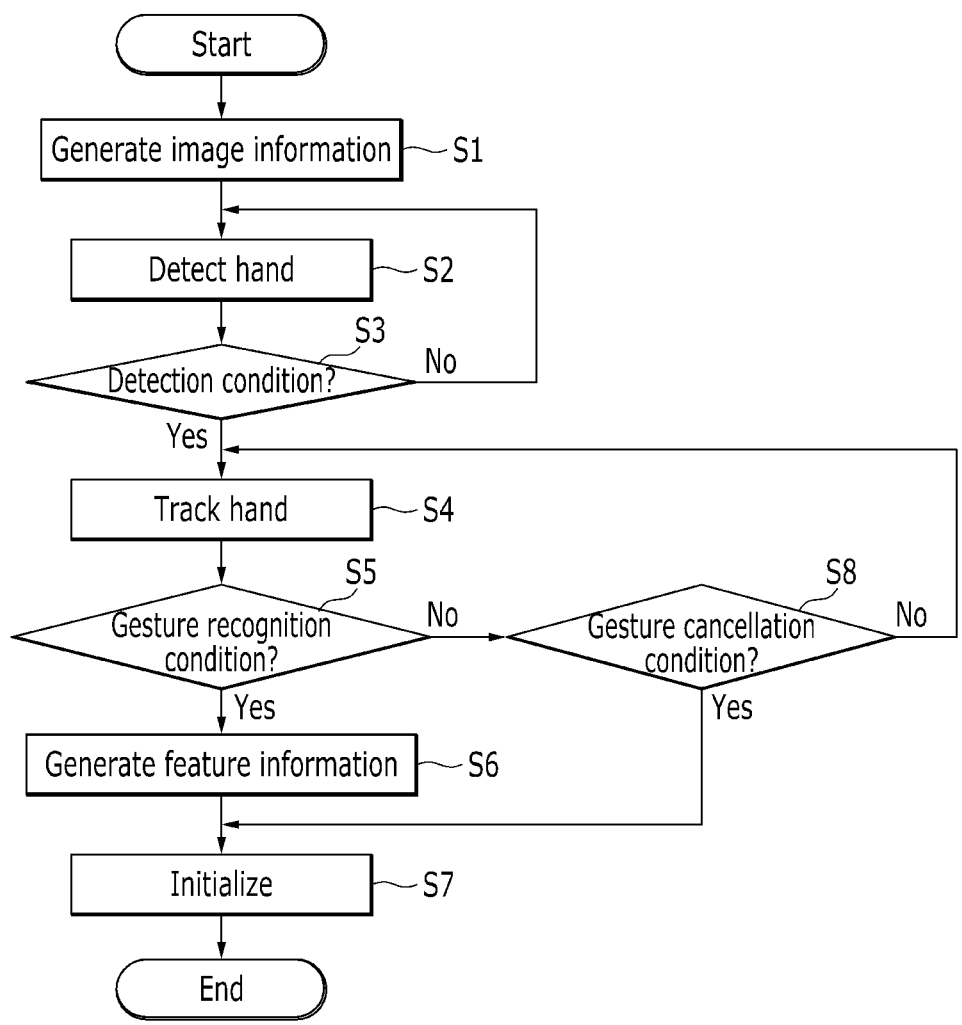
FIG. 2 is a flow chart illustrating a vehicle operation method according to an exemplary embodiment of the present disclosure.

FIG. 2 is a flow chart illustrating a vehicle operation method according to an exemplary embodiment of the present disclosure.

Referring to FIG. 2, first, the gesture sensor 10 senses the motion of the user to generate the image information (step S1). The gesture recognizer 20 detects the user's hand from the image information (step S2).

Next, the gesture recognizer 20 determines whether a pattern of the detected hand corresponds to the detection condition (step S3). Herein, the detection condition may include the gesture input pattern. As the determination result, when the pattern of the hand corresponds to the detection condition, the gesture recognizer 20 activates the gesture input mode. On the other hand, when the pattern of the hand does not correspond to the detection condition, the gesture recognizer 20 continuously detects the pattern of the hand.

Next, the gesture recognizer 20 tracks the motion of the hand to generate the trajectory (step S4). Further, the gesture recognizer 20 determines whether the trajectory of the tracked hand satisfies the gesture recognition condition (step S5). For example, the gesture recognizer 20 may determine that the gesture input is completed and the gesture may be recognized in the case in which the motion of the hand stops.

Next, as the determination result, when the recognition condition is satisfied, the gesture recognizer 20 generates the feature information depending on the trajectory of the hand and transfers the generated feature information to the controller 30 (step S6). Further, the gesture recognizer 20 initializes the recognition operation for the corresponding gesture (step S7).

On the other hand, as the determination result in step S5, when the trajectory of the tracked hand does not satisfy the recognition condition, the gesture recognizer 20 determines whether the trajectory of the hand or the vehicle state satisfies the gesture cancellation condition (step S8). For example, when the gesture cancellation information, such as the operation of an interior light by the user during the input of the gesture and sudden acceleration of the vehicle, is input, the gesture recognizer 20 may determine that the gesture cancellation condition is satisfied.

As the determination result, when the gesture cancellation condition is satisfied, the gesture recognizer 20 initializes the recognition operation for the corresponding gesture. On the other hand, when the gesture cancellation condition is not satisfied, the gesture recognizer 20 continuously tracks the trajectory of the hand to perform the gesture recognition operation.

That is, according to the exemplary embodiments of the present disclosure, only when the user intentionally inputs the gestures, the gesture is recognized, and the process of recognizing the gesture is forcibly initialized by determining the non-intentional gesture. As a result, it is possible to prevent the phenomenon that the operation device is operated by the operation of moving the user's hand in order for the user to press the button or perform meaningless operations. Further, the gesture recognition process is activated by accurately detecting the operation of starting and ending the input of the gesture and the feature information is extracted, thereby preventing the phenomenon that the gesture is misrecognized.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A vehicle operation device, comprising:
a gesture sensor configured to sense a user's hand to generate image information;
a gesture recognizer configured to recognize a gesture by using the image information and generate feature information of the recognized gesture; and
a controller configured to generate vehicle state information by sensing a vehicle state and perform a control operation corresponding to the feature information,
wherein the gesture recognizer determines whether the gesture or the vehicle state correspond to a predetermined gesture cancellation condition by using the image information and the vehicle state information, and initializes a recognition operation of the gesture when the gesture or the vehicle state corresponds to the gesture cancellation condition during the recognition operation, such that generation of a feature information by the cancelled recognition operation may be prevented.

2. The vehicle operation device of claim 1, wherein:
the gesture sensor includes at least one of a camera capturing an image of the user's hand and a sensor sensing a motion of the hand.

3. The vehicle operation device of claim 1, wherein:
the gesture recognizer detects the hand from the image information and tracks a motion of the detected hand to recognize the gesture.

4. The vehicle operation device of claim 3, wherein:
the gesture recognizer tracks the motion of the hand depending on whether a pattern of the detected hand satisfies a detection condition.

5. The vehicle operation device of claim 4, wherein:
the detection condition includes a gesture input pattern which activates a gesture input mode.

6. The vehicle operation device of claim 3, wherein:
the gesture recognizer generates a trajectory corresponding to the motion of the hand and recognizes the gesture depending on whether the trajectory of the hand satisfies a gesture recognition condition.

7. The vehicle operation device of claim 6, wherein:
the gesture recognition condition includes at least any one of a state in which the motion of the hand stops, a state in which the motion of the hand passes a predetermined period of time or more, and a state in which the gesture is input as an input completion pattern which inactivates the gesture input mode.

8. The vehicle operation device of claim 1, wherein:
the gesture cancellation condition is at least any one of a situation in which the input of the gesture stops, a situation in which the gesture is input as an input cancellation pattern, a situation in which an operation of a physical button disposed in a vehicle is sensed, and a situation in which a driving environment of the vehicle is changed.

9. The vehicle operation device of claim 1, wherein:
the gesture recognizer initializes a recognition operation of the gesture when the feature information is generated.

10. The vehicle operation device of claim 1, wherein:
the gesture recognizer detects a specific hand pause of the user and recognizes the gesture with the detected hand pause.

* * * * *